United States Patent [19]

Lemelson

[11] 4,437,241

[45] Mar. 20, 1984

[54] MEASURING INSTRUMENT AND METHOD

[76] Inventor: Jerome H. Lemelson, 85 Rector St., Metuchen, N.J. 08840

[21] Appl. No.: 275,630

[22] Filed: Jun. 22, 1981

Related U.S. Application Data

[63] Continuation-in-part of Ser. No. 68,609, Aug. 22, 1979, abandoned.

[51] Int. Cl.³ .............................................. G01B 3/18
[52] U.S. Cl. ...................................................... 33/166
[58] Field of Search .............. 179/1 SD, 1 SA, 1 SM; 33/163–166, 143 L, 147 L, 169 R, 170 R, 174 L; 235/95 DN, 95 MT; 364/560–564

[56] References Cited

U.S. PATENT DOCUMENTS

| | | | |
|---|---|---|---|
| 3,226,833 | 1/1966 | Lemelson | 33/163 X |
| 3,453,752 | 7/1969 | Williams | 33/166 X |
| 3,482,321 | 12/1969 | Inshaw | 33/125 C X |
| 3,845,564 | 11/1974 | Morgan | 33/166 X |
| 3,870,818 | 3/1975 | Barton | 179/1 SM |

FOREIGN PATENT DOCUMENTS 2806429 10/1978 Fed. Rep. of Germany ... 179/1 SM

Primary Examiner—Harry N. Haroian

[57] ABSTRACT

A measuring device, such as a micrometer or other form of dimensional measuring instrument, capable of indicating a dimensional measurement by means of sounds of speech such as a train of numbers defining the measurement made. In one form, the device has a C-frame defining a housing for electronic circuit elements for effecting measurements, controlling a display to display the results and controlling operation of a synthetic speech generator to generate speech signals indicative of measurements made. In another form, an electronic memory is also provided for recording measurements and other data such as indications of the dimensions measured and identifying the article, assembly or part measured.

18 Claims, 5 Drawing Figures

MEASURING INSTRUMENT AND METHOD

RELATED APPLICATIONS

This is a continuation-in-part of Ser. No. 68,609 filed Aug. 22, 1979 for Measuring Device and Method, now abandoned.

SUMMARY OF THE INVENTION

This invention relates to measuring devices, such as micrometers, for measuring dimensions of objects wherein an indication of a dimension being measured is obtained by means of sounds of words, such as a train of numbers defining a dimension measured. In one form of the invention, a numerical indication of a measurement made by means of a micrometer is in the form of synthetic speech signals fed to a speaker, which signals are generated by electronic circuitry supported within the frame or body of the micrometer. Such speech may also be provided to a person using the measuring instrument as sounds on the outputs of one or more ear plug transducers fitted within the ear of a person making the measurement. A visual indication of the measurement is also provided on a display so that the user of the micrometer may employ visual or audio means to indicate the dimension being measured.

It is known in the art to employ measuring devices such as calipers and micrometers to measure lineal dimensions of articles of manufacture by surface contact of movable and stationary surfaces of the micrometer with opposite surfaces of the article or objects being measured and to visually note calibrated marks or numerical indications displayed or adjusted in their locations along a portion of the micrometer which moves proportionately with the movement of an anvil which contactso one of the surfaces of the object between which surfaces measurement is being made. While the visual technique of measuring a dimension suitably serves the purpose of effecting such measurment, there are times when a visual indication of measurement is either difficult or interferes with the procedure of effecting measurements. For example, if a measurement is being made in an atmosphere of poor illumination, it may be difficult to read the instrument. If the measuring instrument is one requiring extrapolation, measurements may also be difficult and may be subject to human error. If the person making the measurement has poor eyesight, the measurement may also be subject to error. Also, blind persons have heretofore not been able to perform measurement functions using a conventional micrometer or caliper.

It is accordingly a primary object of this invention to provide a new and improved apparatus and method for effecting a lineal measurement.

Another object is to provide a new and improved micrometer for effecting and indicating a lineal measurement.

Another object is to provide a device for measuring dimensions and providing an indication of dimensions measured by audio means.

Another object is to provide a measuring device which automatically indicates by means of synthetic speech, a dimension measured thereby.

Another object is to provide a micrometer which indicates a measurement made thereby, by means of sounds such as speech sounds of numbers indicating a dimension.

Another object is to provide a micrometer which indicates both visually and by means of synthetic speech sounds, dimensions which are measured thereby.

Another object is to provide a measurement device which indicates by means of synthetic speech sounds, dimensions of articles measured thereby and also is provided with an output on which synthetic speech signals may be generated and transmitted to a recorder for recording such speech indications of the dimensions measured.

Another object is to provide a micrometer containing electronic circuit means for generating synthetic speech signals indicative of dimensions measured and a speaker for generating sounds of synthetic speech of numerals to permit the user of the micrometer to hear words indicative of a dimension measured wherein a memory is provided for recording such synthetic speech signals so that the user may repeat the playback thereof in the event that the originally generated sounds are not properly heard.

Another object is to provide a dimension measuring instrument employing electronic means for determining and indicating measurement wherein both a numerical indication of measurement and an indication that a measurement falls within a tolerance range may be presented and wherein such tolerance range may be varied by the person using the instrument to account for different measuring requirements.

With the above and such other objects in view as may hereinafter more fully appear, the invention consists of the novel constructions, combinations and arrangements of parts which will be hereafter more fully described and illustrated in the accompanying drawings, wherein are shown embodiments of the invention but it is to be understood that changes, variations and modifications may be resorted to which fall within the scope of the invention as claimed without departing from the spirit and nature of the invention.

DESCRIPTION OF THE DRAWINGS

In FIG. 1 is shown a measuring device 10, such as a micrometer, having a fixed dimension housing 11 defining a rigid frame for supporting a threaded spindle 12, a graduated sleeve 13, a thimble 14, a spring loaded knurled adjustment knob 15, an anvil 16, a spindle mounted gear 17, a potentiometer 25 with an attached gear 18 which meshes with the spindle gear 17, a spring loaded shaft 20 containing respective protruding teeth or cams 20A and 20B, a normally open limit switch 24, an on/off switch 21, a push button switch 22 for operating a display 33 and an opening 23 in the side wall of housing 11 across which opening a speaker is supported. Shaft 20 is a continuation of the knurled adjustment knob 15 or is operatively connected thereto for rotation therewith.

Figure 1:
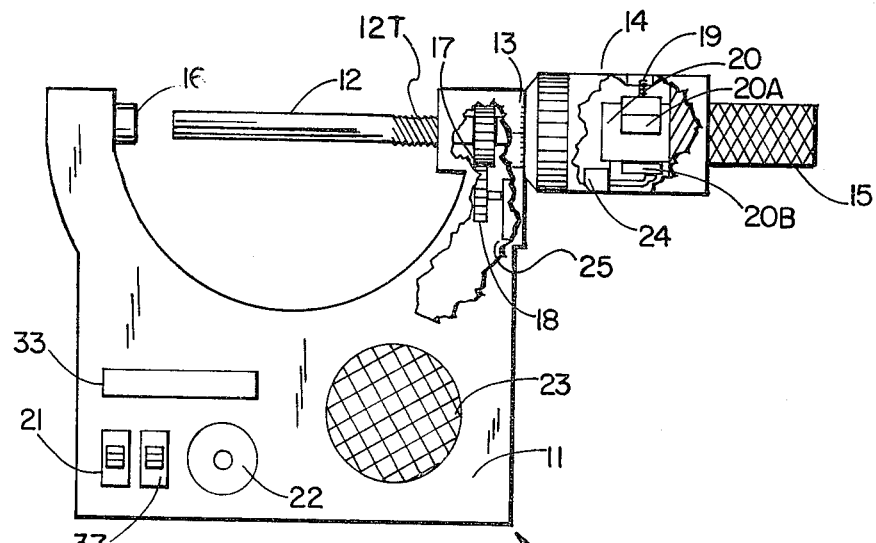
FIG. 1 is a side view with parts broken away for clarity of a hand-held measuring instrument in the form of a micrometer including electrical and electronic means for indicating a measurement made thereby including both visual and sonic indications.

A desired measurement may be made in a conventional manner wherein an object, a dimension of which is to be determined, is placed between the end surface of the spindle 12 and the anvil 16. The adjustment knob 15 is rotated causing the thimble 14 to rotate therewith by torque applied through the tooth 20A to spring 19 which is anchored within the thimble housing. A threaded portion 12T of the spindle 12 engages within a threaded collar (not shown) supported within the housing of the sleeve 13 causing movement of the spindle 12 toward and away from the anvil 16 depending on the direction of its rotation in a manner in which a conventional micrometer is operated. When the end of the spindle 12 has engaged a surface of an object being measured, further rotation of knob 15 causes compression of spring 19 by engagement of tooth 20A thereagainst causing relative rotation of the shaft 20 with respect to the thimble 14. When a predetermined torque is applied to knob 15 thereafter, shaft 20 rotates sufficiently to cause tooth 20B to actuate a normally open limit switch 24 causing a measurement reading to be effected as described hereafter. As the spindle 12 is advanced towards the anvil 16, gear 17 meshes with and rotates gear 18 which is connected to rotate a multiturn potentiometer 25 causing subsequent operation as described hereafter.

Figure 2:
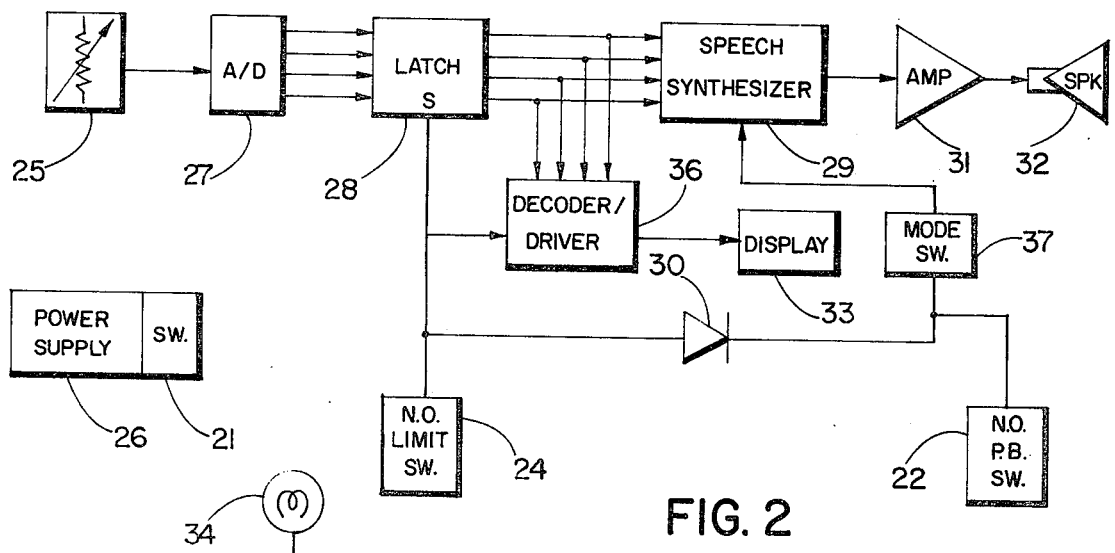
FIG. 2 is a schematic diagram of the subsystem electronic components of the device illustrated in FIG. 1.

In FIG. 2, which schematically illustrates a typical electronic arrangement involving the micrometer 10, a suitable power supply 26, such as a replacable or rechargable battery with an on/off switch 21, is provided to power the electronics of the system. The position of spindle 12, which is representative of the distance between the end of the spindle and the face of the anvil 16, is defined by electrical signals defined by potentiometer 25, which signals are subsequently converted to digital form by an analog-to-digital converter 27, the output of which is applied to a multiple bit latch 28. When proper torque is applied to the knob 15, normally open limit switch 24 causes the latch 28 to be set and activates a speech synthesizer 29 such as a Texas Instrument Corp. TMC 0280 integrated circuit with support circuits, via an isolation diode 30 and a mode switch 37. The speech synthesizer 29 outputs electrical signals representative of a verbalization of data input to the synthesizer from the multiple bit latch. Such signals are amplified in an amplifier 31 and audibly reproduced by a speaker 32. The limit switch also provides power to a decoder/driver 36 which causes data input from the latch to be visually presented by a numerical display 33.

Information representative of the measurement being made is held in the latch 28, so that the micrometer may be removed from the work and transported to another location where it may again be heard by momentary activation of a push button read switch 22. Closure of switch 22 causes energization of the speech synthesizer via a mode switch 37, to repeat the measurement representation. This procedure may be repeated as often as required. Memory information from the multiple bit latch is lost whenever power is turned off or a subsequent measurement causes reactivation of the limit switch.

Figure 3:
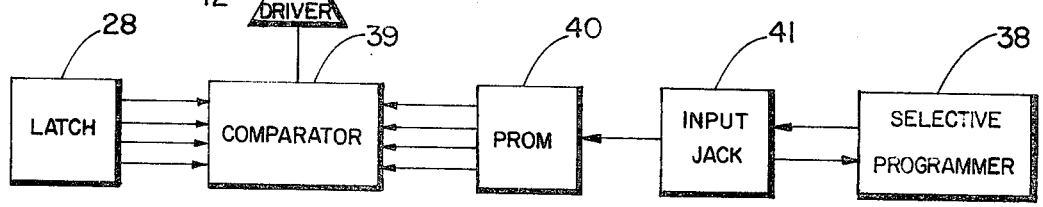
FIG. 3 is a schematic diagram of a variation in the electronic system illustrated in FIG. 2.

In FIG. 3, output from the multiple bit latch 28 is also shown as input to a comparator 39. An input jack 41 provides access to enter information defining a tolerance range into a programmable read only memory (PROM) 40 by means of a selective programmer 38. The PROM is also input to the comparatator 39. When data from the latch 28 is generated which is within the tolerance range established in the memory of the PROM, a time signal is sent to a driver 42 to power an indicator 34. In this manner, the micrometer may be used as a quality control device or to detect specific defects.

Figure 4:
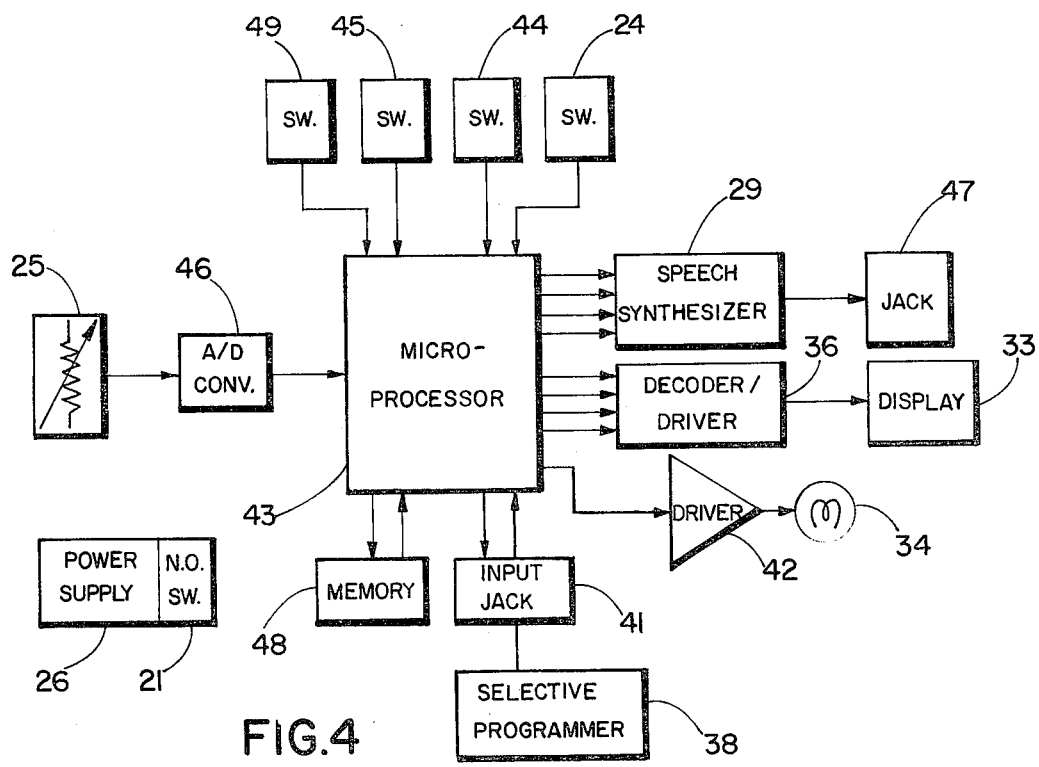
FIG. 4 is a schematic diagram illustrating yet another embodiment of the invention.

In FIG. 4, electrical energy from a power supply 26 such as provided in FIG. 2, is utilized and measurement information is converted to electrical signals by a potentiometer 25 as described in FIG. 1. These signals are input by means of an analog-to-digital converter 46 to a microprocessor 43 powered by the above mentioned power supply. A read-out switch 49 is connected to the microprocessor as are an indicator switch 44 and a tolerance deviation switch 45. A signal from the read-out switch 49 to the microprocessor causes the measurement data input to the microprocessor to be visually presented on a visual character display 33 by means of a decoder/driver 36 and to be audibly produced by a speech synthesizer 29 which is connected to an earphone jack 47. A headset or earphone connected to this jack insures clarity and volume over background noises in factories and shops. The indicator switch directs the microprocessor to signal driver 42 and to power an indicator 34 whenever the input measurement is within a range defined by information which has been previously entered into a programmable memory 48. Input jack 41 provides two-way access to the microprocessor by a selective programmer 38 so that tolerance range or ranges may be entered and, measured parts which are both within or out of the tolerance range can be counted, etc. The tolerance deviation switch 45 is provided to signal the microprocessor to compute and represent the deviation from the desired value or range.

Figure 5:
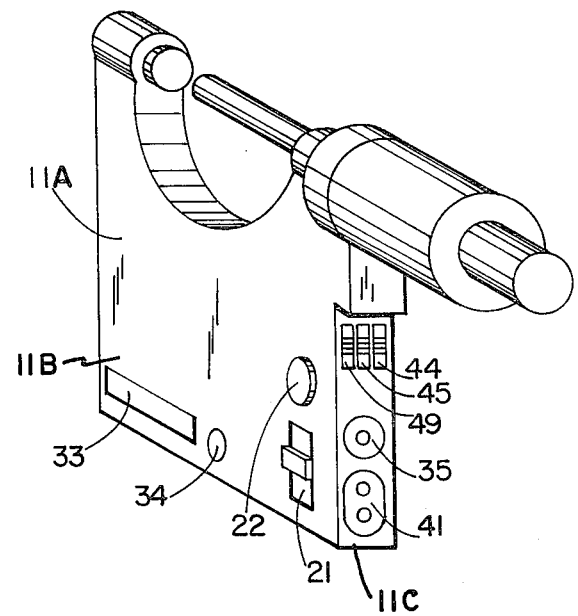
FIG. 5 is an isometric view of a micrometer containing features set forth in FIG. 4.

In the embodiment illustrated in FIG. 5, which contains the electronic measuring circuits of FIG. 4, housing 11A supports on-off switch 21 located on the sidewall thereof which also supports a normally off pushbutton switch 22 for energizing display 33 which is selectively activated when switch 49 is closed, and causes signals recorded in the memory of the microprocessor to drive said display. Also supported by the sidewall 11B of the housing 11A is indicator light 34 for indicating if the measurement just made or recorded in the memory of the microprocessor is within a given tolerance.

The end wall 11C of housing 11A supports the described manual switches 44, 45 and 49 as well as input recepticles 35 and 41 for respectively accomodating a microphone lead and to input command signals to the microprocessor 43 as generated by a computer, keyboard or other device located external od the micrometer housing. The recepticle 41, or another such recepticle supported by the housing 11A, may be employed to receive signals generated from the memory or active circuits of the microprocessor 43 and indicative of the last measurement or groups of measurements made, in response to a query signal or the activation of another control switch supported by the housing, which latter signals may be transmitted to a memory or remote computer for record keeping and other quality control or machine control purposes.

It is also noted that the described signal processing, speech synthesizing and sound generating circuits as well as the speaker and display may be provided in a separate housing and connected to the potentiometer and switches associated with the micrometer through a flexible cable.

While the micrometer shown in FIGS. 1 and 5 is operable to measure outside dimensions of objects, it may also be constructed in accordance with known measuring instruments for measuring inside diameters, height or other variables which are announced by means such as provided herein. Other known measuring devices for measurements such as surface roughness, web thickness, distance (including radar and sonar distance instrumentation), defect measuring devices and circuits, vibration analysis instrumentation, beam scanning image analysis, nuclear magnetic resonance measuring and scanning electron microscope apparatus may be provided which generate signals indicate of measurements such as quantitative measurements of dimensional, area, signal characteristics, pressure, temperature, electrical resistance, potential, amperage, power, noise, and other variables which are to be determined by means of associated instrumentation, may be employed with speech synthesizing and word generating means as described to provide the user or users thereof with vocal indications as well as visual presentations of specific measurements so made to facilitate the measuring procedure, reduce the degree of attention required, free the operator's hand or vision for performing other functions and to allow blind persons to operate same.

It should be understood with respect to all of the embodiments described above, that power supplies having the correct polarities and magnitudes are provided where not indicated in the drawings so as to supply proper electrical energy for appropriately operating the various illustrated components and circuits as described in the specification.

Additional variations in the broad instant invention are noted as follows:

(A) The microprocessor of FIG. 4 may contain a memory and may be operable to store a plurality of different measurements made by the micrometer together with code signals indicative of the respective article or part and the dimension thereof defined by the signals indicating such measurements. Control means, either in the form of switches supported by the micrometer or a keyboard which is pluggably connectable to the micrometer circuits, may be employed to selectively derive display and synthetic speech signals of all or selected of a plurality of measurements made to provide such information in intelligible form for monitoring purposes.

(B) The micrometer 10 may also contain a connector for pluggably connecting the recording circuits or memory of the microprocessor containing recordings of measurements made with an external computer or recorder to present one or more of the measurement indicating dimensions and work identification signals described to the computer for record keeping, analysis and quality control purposes.

(C) The microprocessor 43 may also be operable to generate digital code signals indicative of the dimensions measured as well as dimension identifying signals recorded therein in pulse or time code form, which code signals may be selectively fed to activate a speaker associated with the speech synthesizer 29 so that acoustic coupling may be effected between such speaker and an external microphone for transmitting such coded information to a computer or recorder on an audio circuit or communication system such as a telephone communication system.

(D) The system and technique described may be used to indicate with synthetically generated sounds of speech dimensions measured by the use of computerized or computer assist automatic measurement systems such as multi-axis automatic measurement machinery of the types manufactured by the Bendix Corporation of Southfield, Michigan wherein speech indications may be selectively provided for the operator or user of such machinery of particular dimensions being measured.

(E) The measurement technique and synthetic speech generating means described may also be employed in other measurement systems such as beam scanning systems employing image analyzing computers wherein image fields are scanned and the resulting data digitized and automaically analyzed by a computer which generates signals indicative, not only of specific measurements, but also of such physical phenomena as areas, faults or flaws identified or indications of specific shapes in the image field wherein the image analyzing computer detection and identification is indicated by code signals which are employed to generate synthetic speech indications of such phenomena as described.

(F) The synthetic speech generating means described may also be employed to verbally indicate conditions detected by means of radar wherein automatic image analysis of the images generated on a radar screen is employed, by means of a computer, to provide certain verbal warnings and audio speech signals thereof to be broadcast to a remote receiver, such as a radio receiver of the pilot of an aircraft which is effected by or is intended to operate thereafter in accordance with the characteristics of the radar information generated.

It is noted that the speech synthesizing circuit 29 is also operable and controlled in its operation to generate one or more words other than words of numbers such as the word "point" indicating a decimal point in the number indicating the measurement made. It may also be operable to generate signals defining words which indicate that particular measurements made are for dimensions which are acceptable or are out of tolerance in accordance with signals derived from one or more memories which are compared with those derived from actual measurements made.

(G) Memory 48 of FIG. 4 or another microelectric memory or chip operatively connected to microprocessor 43 and having the capability of erasably storing variable information therein, may be employed to record such digital data as codes indicative of measurements made such as the codes employed to activate the speech synthesizing circuits 29 and/or the decoder-driver 36 when gated thereto through the microelectronic processor 43. Such recordings of signals indicating measurements made by the measuring instrument or micrometer may be recorded along with other variable data such as one or more codes indicative of one or more variables such as part dimensions measured, part or lot number, date or time of measurement and inspector or machine operator number. Such latter additional information may be generated by one or more input means connected to the electronic system or microprocessor through a flexible cable and extending from a keyboard, light pen or other code reading device activated by the operator of the micrometer to read a code, such as a bar code, printed on a sheet, provided on a card or recorded on the part or assembly being measured or inspected. Such a code reading transducer or keyboard may also be supported by the measuring instrument or micrometer itself such as by a select portion of the housing 11 or 11A and conveniently operable by he user of the micrometer. Such recorded information recorded in the electronic memory may be selectively reproduced therefrom by selectively activating the keys and switches of the keyboard to provide such information in the described speech-sound form and/or on one or more lines of the electronic display 33. Such recorded information may also be serially read out into a computer, remote memory or hard copy generator such as a printer to provide a visually readable copy of all or selected measurements made with the instrument.

I claim:

1. A measuring instrument comprising:

a support, first and second work surface contacting means supported by said support, means for moving said first surface contacting means with respect to said support and an article positioned between said first and second surface contacting means to cause said first surface contacting means to engage a first portion of the surface of said article while an opposite portion of said article is engaged by said second surface contacting means, means for sensing movement of said first surface contacting means and generating an electrical analog signal which varies in accordance with the movement of said first surface contacting means, analog-to-digital conversion means for receiving and digitizing said electrical analog signal and generating digital signals indicative of the degree of movement of said first surface contacting means with respect to said support, microminiature electronic circuit synthetic speech signal generating means operable for generating speech signals of words of numbers including the numbers "0" to "9", and first control signal generating means connected between said analog-to-digital conversion means and said microminiature electronic speech signal generating means for receiving digital signals generated on the output of said analog-to-digital conversion means and operable to output control signals for controlling the operation of said microminiature electronic circuit synthetic speech signal generating means to cause the latter to generate a chain of synthetic speech signals defining a sequence of numbers which are indicative of measurements made by said device, force sensing means connected to said first surface contacting means and operable to generate a measurement indicating control signal upon sensing a force applied between said first surface contacting means and a workpiece, and means for applying said measurement indicating control signal to said first control signal generating means to cause the latter to control the operation of said microminiature electronic circuit synthetic speech signal generating means to generate a plurality of synthetic speech signals which are indicative of the distance between said first and second surface contacting means when a workpiece is disposed therebetween and said first and second surface contacting means are in contact with opposite surfaces of said workpiece and when said first surface contacting means engages one surface of said workpiece with a predetermined, and means for receiving and transducing said synthetic speech signals to sounds of words defining a sequence of numbers which indicate the measurement made by said measuring instrument.

2. A measuring instrument in accordance with claim 1 wherein said means for sensing movement of said first surface contacting means comprises a variable potentiometer.

3. A measuring instrument in accordance with claim 2 wherein said first control means comprises a multibit latch.

4. A measuring instrument in accordance with claim 3 wherein said force sensing means comprises a normally open limit switch and means for closing said limit switch when a predetermined force is applied between said first contacting means and a surface of a workpiece.

5. A measuring instrument in accordance with claim 4 including a decoder-driver connected to the output of said multiple bit latch, a visual display means connected to be controlled by said decoder-driver and operable to display measurements made when said normally open limit switch is closed.

6. A measuring instrument in accordance with claim 1 wherein said first control signal generating means includes a memory for retaining signals received from said analog-to-digital conversion means when said first surface measuring means is stationary and manually operable control means for querying said memory and causing said first control means to repeatedly control said microminiature electronic synthetic speech signal generating means to generate the same train of synthetic speech signals on its output for repeatedly generating the same sequence of words indicative of a measurement made by said instrument when said force sensing means is activated and said first surface contactung means is stationary.

7. A measuring instrument in accordance with claim 1 in the configuration of a hand held device defined by a rigid housing and manually operable means for driving said first work surface contacting means towards and away from said second work surface contacting means; said analog-to-digital conversion means, said microeletronic circuit synthetic speech signal generating means, said control signal generating means and means for transducing speech signals to sounds being supported by said housing.

8. A measuring instrument in accordance with claim 1 in the configuration of a hand holdable micrometer having an open frame defining a housing and supporting said first and second work surface contacting means at opposite ends of the opening in said frame; said analog-to-digital conversion means, said microelectronic circuit synthetic speech signal generating means and said control signal generating means all contained within said housing, said means for transducing synthetic speech signals to sounds of words comprising a speaker also supported within said housing and an opening in the wall of said housing for permitting sounds generated by said speaker to pass to the exterior of said housing and to be heard by the user of said micrometer.

9. A measuring instrument in accordance with claim 8 wherein said micrometer includes a finger operated thimble connected to said first surface contacting means and screw thread means for advancing and retracting said second surface contacting means when said thimble is turned by hand, said force sensing means being supported within said thimble and including a normally open limit switch which is closable when a force is applied to said force sensing means when said first surface contacting means is driven against a work surface.

10. A measuring instrument in accordance with claim 1 wherein said microminiature electronic synthetic speech signal generating means is operable to generate a speech signal defining the word "point" and said control signals output by said first control means are operable to activate said synthetic speech signal generating means to cause same to generate said speech signal defining the word "point" in proper sequential order with respect to speech signals generated thereby and defining numbers which indicate measurements made in thousandths of a measuring unit such as an inch.

11. A method of effecting and vocally indicating a measurement comprising:

operating a measuring instrument in a manner to detect a variable to be measured, which variable may vary quantitatively and wherein the quantitative value thereof may be detected by said measuring instrument and such quantitative value may be expressed in terms of a number having a decimal point, generating a first signal when a first quantitative variable is detected by said instrument wherein said first signal is indicative of the degree of the quantitative variable being measured, generating a second signal which indicates that said measuring instrument and a workpiece are predeterminately positioned with respect to each other, using said second signal to cause a measurement reading to be effected by activating a speech signal synthesizing circuit, processing said first signal and deriving control and address signals therefrom and presenting such control and address signals to address and control said speech signal synthesizing circuit means, which speech signal synthesizing means is operable, when automatically controlled and addressed, to generate selected speech signals in sequence which speech signals are representative of selected of the numbers "1" to "9" and "0" as well as the word "point" which is indicative of a decimal point, controlling said speech signal synthesizing means by means of said control and address signals to generate a plurality of selected synthetic speech signals which synthetic speech signals define a train of numbers and additional speech signals defining the word "point" wherein such signals are generated sequentially on an output and are indicative of a decimal pointed number defining a measurement made, and presenting said synthetic speech signal in a selected sequence to an electrical-to-sound transducer for transducing a sequence of sounds in the form of words providing a train of words of speech of numbers and the word "point" in an order defining a numerical indication of the measurement made including a quantity thereof which is less than one.

12. A method in accordance with claim 11 wherein the variable detected is a quantitative variable and the control signals generated are digital signals indicative of a quantity variation from a known quantity.

13. A method in accordance with claim 12 wherein the quantity measured and vocally indicated by said electrical-to-sound transducer is a distance between elements of the instrument and indicative of a distance between surfaces of a workpiece being measured.

14. A measuring instrument comprising:
a support, first and second work surface contacting means supported by said support, means for moving said first surface contacting means with respect to said support and an article positioned between said first and second surface contacting means so as to cause said first surface contacting means to engage a first portion of the surface of said article while an opposite portion of said article is engaged by said second surface contacting means, means for sensing movement of said first surface contacting means and generating electrical signals which vary in accordance with movement of said first surface contacting means, first electrical circuit means for receiving and processing said electrical signals and generating signals representative of the degree of movement of said first surface contacting means with respect to said support, microminiature electronic circuit synthetic speech signal generating means operable for generating speech signals of words of numbers including the numbers "0" to "9", second electrical circuit means for receiving signals from said first electrical circuit means and responsive thereto for controlling said microminiature electrical circuit synthetic speech signal generating means to cause said synthetic speech signal generating means to generate specific speech signals defining words of speech of numbers in an order which signals are indicative of the distance between said first and second work surface, surface detection means operable when said first surface contacting means engages a surface to generate first control signals and for causing said microminiature electronic circuit means to generate said speech signals defining the distance between said first and second work surfaces, means for receiving and transducing said synthetic speech signals to sounds of words of a sequence of numbers which numbers indicate the measurement made by said measuring instrument, said microminiature electronic circuit synthetic speech signal generating means including means for generating speech signals defining the word "point" for indicating a decimal point in the numerical indication of measurements made with said measuring instrument, said first electrical circuit means being operable to discriminate the signals received thereby which are representative of the degree of movement of said first surface contacting means with respect to said support in terms of fractions of a unit of the distance being measured and to generate a control signal in proper sequence with the signals repesentative of the degree of movement in said first surface contacting means for addressing said electronic synthetic speech signal generating means and causing same to generate synthetic speech signals of numbers and the word "point" which signals are transducable to words of speech in an order indicative of the measurement made when said first and second surface contacting means sense opposite surfaces of a workpiece disposed therebetween.

15. A measuring instrument in accordance with claim 14 wherein said support is hand holdable during a measurement function.

16. A measuring instrument in accordance with claim 15 wherein said support and surface contacting means defines a hand holdable micrometer.

17. A measuring instrument in accordance with claim 14 wherein said first electrical circuit means and said microminiature electronic circuit means are both supported within said support.

18. A measuring instrument in accordance with claim 14 wherein said means for transducing said synthetic speech signals to sounds of words of numbers indicating the measurement instrument is supported by said support.

* * * * *